Figure 1:
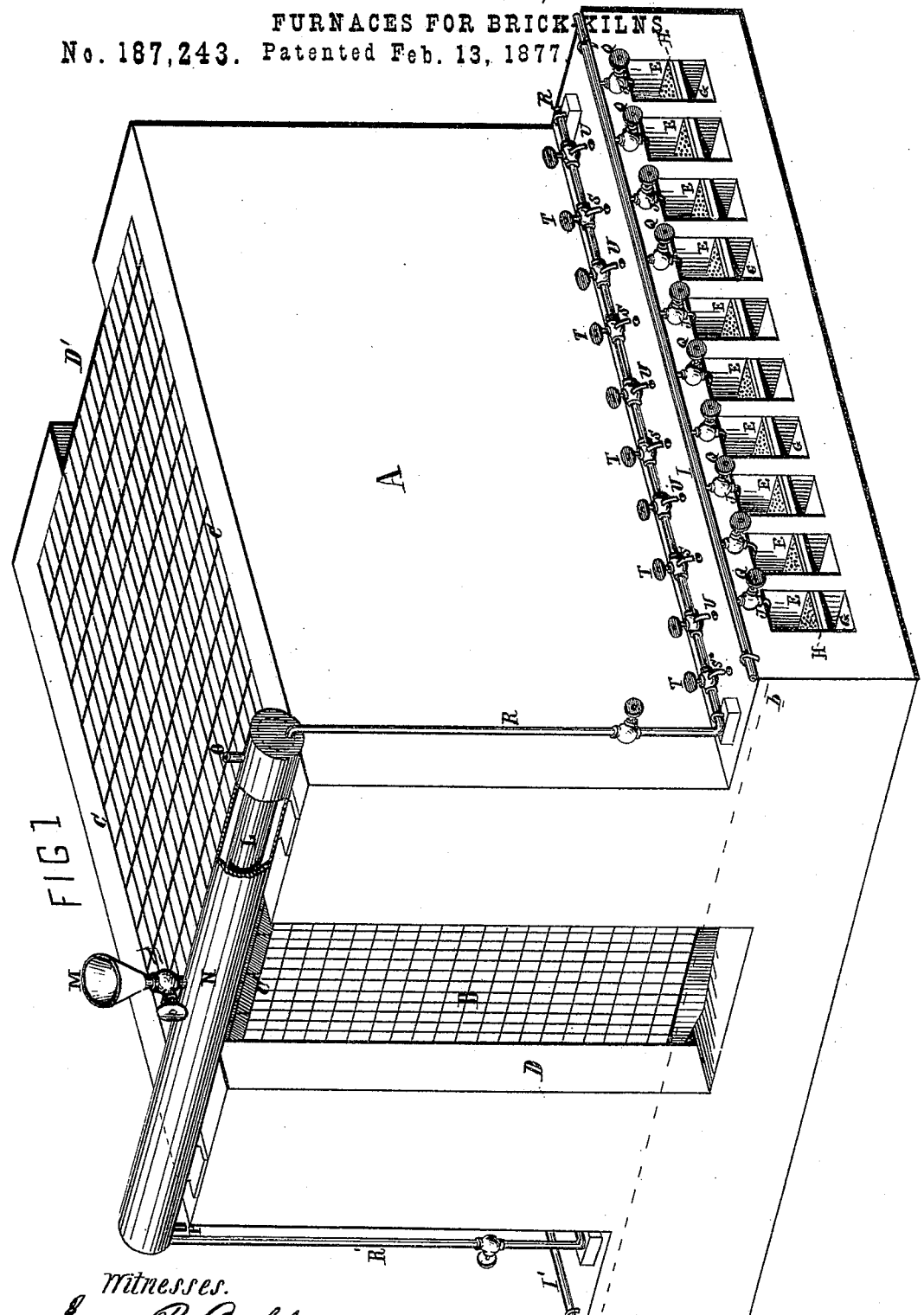

3 Sheets—Sheet 3.

H. W. ADAMS, Jr.
FURNACES FOR BRICK-KILNS.

No. 187,243. Patented Feb. 13, 1877.

UNITED STATES PATENT OFFICE.

HENRY W. ADAMS, JR., OF PHILADELPHIA, PENNSYLVANIA, ASSIGNOR TO HENRY W. ADAMS AND J. Q. A. ZIEGLER, OF SAME PLACE.

IMPROVEMENT IN FURNACES FOR BRICK-KILNS.

Specification forming part of Letters Patent No. 187,243, dated February 13, 1877; application filed June 24, 1876.

*To all whom it may concern:*

Be it known that I, HENRY W. ADAMS, Jr., of the city and county of Philadelphia and State of Pennsylvania, have invented a new and useful Improvement in Furnaces and Fuel for Heating the same, which improvement is fully set forth in the following specification, reference being had to the accompanying drawings.

The object of my invention is to create a better and cheaper heat for the production of steam, the baking or burning of bricks, tiles, pottery, lime, bones, and other similar substances, and the melting of glass or other fusible fluxes.

I have shown a brick-kiln in my drawings, in combination with the furnaces and fuel aforesaid, as one method of utilizing the heat produced by my invention. My furnaces and the heat made in them are applicable to all the various constructions of furnaces now known for the generation of steam, the baking, burning, and calcining molded forms of clay, or bones, or lime, or melting glass, or fusing fluxes, or desulphurizing ores. I believe I have produced a better and cheaper heat than heretofore known; that I have shown by my drawings a method of making this heat continuous at any degree of intensity by means of discharging determinate jets of liquid fuel into the said furnaces, to be ignited by a bed of red-hot coal-dust, or small and poor coal, and driving the products of this combustion by forcible jets of steam or air into the kiln or in contact with the substances or articles to be heated.

To comprehend the nature and value of my invention, it is necessary to consider that I produce a greater amount of flame and incandescent gases from the cheapest fuel ever known to me for the purposes aforesaid, and that I drive the same out of my furnaces by a forcible blast into my kilns and circulate the same equally through all the interstitial spaces and honey-comb of the same, in so abundant a manner as to bake, burn, and calcine the top and sides, and portions of the charge most remote from the fires, in a perfectly equable and uniform manner. To burn bricks hard and uniform, and develop the deepest and brightest red color, a great abundance and a continuous production of flame are necessary; hence wood is better than coal for this purpose. Its great scarcity, however, renders it in many places too dear to be used. Most coal-fires generate so much sulphureted hydrogen as to darken and deaden the bright red color of bricks by decomposing the sesquioxide of iron in the clay, to which the red color is due, and converting it into the dark sulphuret of iron. My fuel, on the contrary, generated by the combustion of coal-tar, dead-oil, or other cheap fluid fuel, on a glowing bed of hard coal-dust, produces an abundance of pure flame, which brightens and reddens the sesquioxide of iron in the clay to a rare and beautiful brilliancy.

I consider this to be one great point in my invention, so far as it relates to the burning of bricks and other molded form of clay. I have also found this pure-flame yielding fuel to be the best adapted for the burning of pure white lime, free from ashes and coloring substances.

I do not limit myself to the form of kiln shown in my drawings, but propose to use any known construction of kiln or kilns for the baking, burning, or calcining any of the aforesaid articles, or for the generation of steam, provided that I shall use the three prime elements of my invention when employed in combination, namely—first, a glowing bed of fuel on the grate-bars; second, a jet of gas-tar, dead-oil, or other cheap liquid fuel, falling onto the same and bursting into flame; and third, the blast of forcible jets of steam or air discharged into the said furnaces above the said solid and glowing fuel, by which air is drawn into the said furnaces, better combustion is made, and the resulting incandescent gases are forced into the said kilns, or into heating-chambers for appropriate uses.

To illustrate more fully the nature of my invention, I will show it in its application to a brick-kiln, reference being had to the drawings and letters accompanying this specification.

Figure 2:
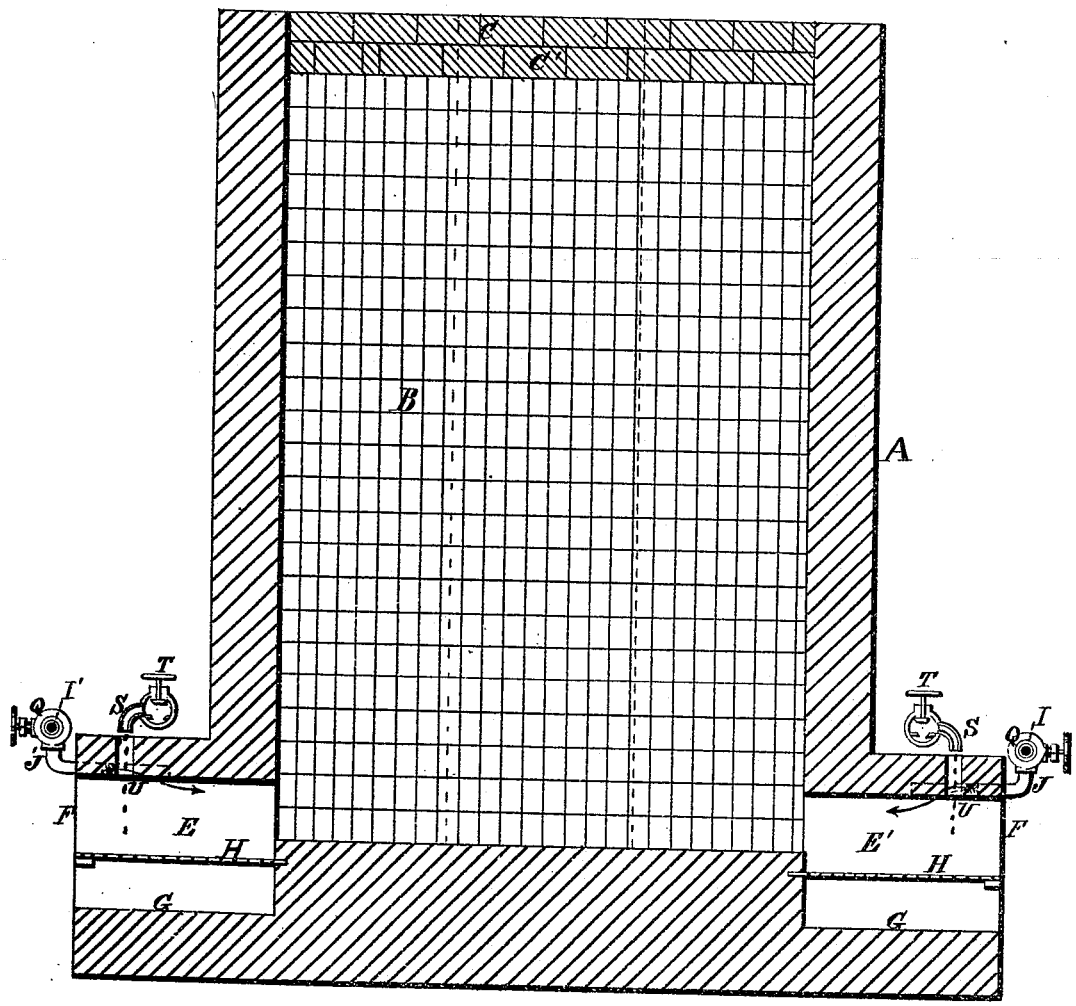
Figure 3:
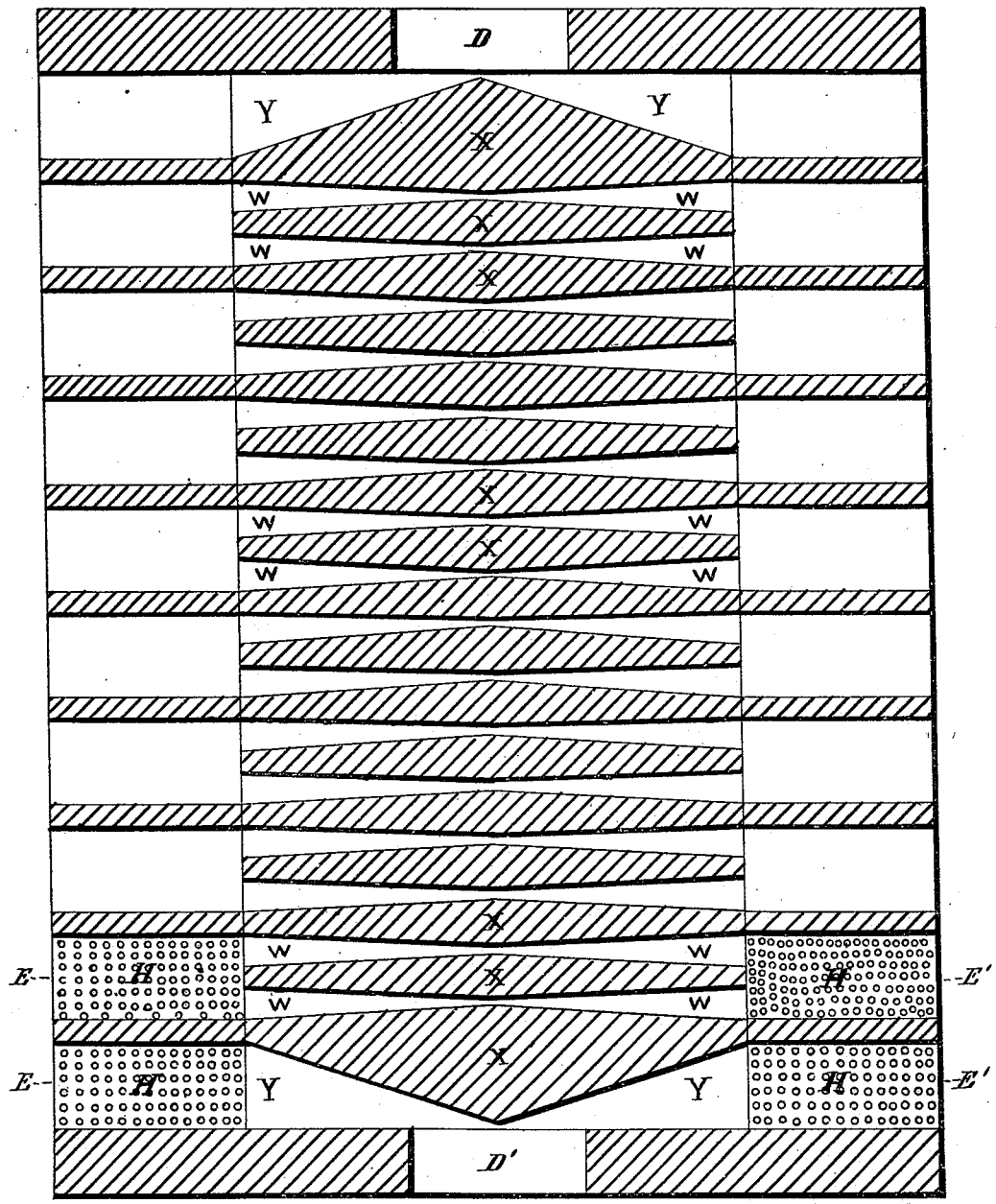

Figure 1 is a perspective view of my brick-kiln. Fig. 2 is a vertical section, showing the furnaces, grate-bars, ash-pits, steam or air blast-pipes, and oil-pipes and jets. Fig. 3 is a plan view on the line *a b* of Fig. 1, showing the arrangement of the furnaces, grate-bars, blast-jets, oil-jets, and first courses of bricks set on the floor of the kiln in such manner as to form flues leading from the fire-places under the whole bottom of the charge, and tapering from the mouths of the fire-places from the opposite sides of the kiln to the center of the same, where they come to nearly a point.

In order to separate this invention from what has been patented in this kiln, I wish to state that the method of using steam in a brick-kiln was first patented to Henry W. Adams, July 21, 1868, No. 80,046; that the steam blast-pipes on the outside of the furnaces of this kiln, for the discharge of jets of steam into the same, was also patented to Henry W. Adams, July 20, 1869, No. 92,770; and that the combination between any cover on the top of a brick-kiln and the steam blast-pipes were patented to me November 23, 1875, No. 170,148.

I disclaim anything in this application for Letters Patent which was patented as aforesaid.

I have shown in my drawings substantially the same form of kiln and attachments which I showed in my application for Letters Patent granted as aforesaid, November 23, 1875. The additions to that kiln, shown in the drawings and specifications which accompany this application, show the nature of my additional invention in its application to kilns of this sort.

A represents a kiln; B represents the bricks set in it; C C' represent the two platting-courses of hard burned bricks laid down, and breaking joints on the top of the raw bricks as a cover to prevent the heat from escaping too freely from the kiln when burning. D D' show the door-ways for driving carts through the kiln when emptying the same, and for wheeling raw bricks into it when setting the same. E E' show the furnaces built on the opposite sides of the kiln. These furnaces are built about two feet wide and six feet long, with an arch turned over the top, about two feet high, above the grate-bars. F represents the doors of these furnaces, G the ash-pit, and H the grate-bars. These grate-bars are cast-iron plates about an inch thick, two feet wide, and six feet long, and perforated with small holes, near together, for the purpose of holding coal-dust or small coal, and preventing it from falling through into the ash-pits, as it would through the ordinary grate-bars. The fires are kindled on these bars with wood and large coal in the first instance, as in the ordinary way. The coal-dust, or small coal, which is very cheap, is then gradually thrown on until it is about eight inches deep. At this depth the steam or air blast, let into the furnaces over the tops of the fire-doors, keeps the mass glowing hot. The steam-pipes, conducting steam from the boilers, or air under pressure, are represented by I I'.

The branches from these pipes provided with stop-cocks for regulating the jets, and terminated with nozzles about seven thirty-seconds of an inch in diameter, and looking into the furnaces over the fire-doors, are represented by J J'. The branches with similar nozzles looking into the ash-pits are shown by letters K K'. The reservoir for holding the coal-gas tar, dead-oil, or other liquid fuel, is represented by L. It is elevated on the top if the wall of the kiln. It may be placed on the outside of the kiln-wall, and piers be built up underneath it to support it; but it should always be considerably higher than the tops of the furnaces, that the oil may flow freely under pressure down to the nozzles which deliver it into the said furnaces. This reservoir is made of boiler-iron, for the purpose of greater safety against fire. It is filled by the funnel M. The letter N shows a jacket round this reservoir, for the purpose of letting in steam to heat the gas-tar or dead-oil, which are liable to congeal in cold weather. O shows the pipe for letting the steam into the jacket. P shows the pipe for discharging the condensed water from the jacket. R R' represent the pipes which conduct the said liquid fuel from the opposite ends of the reservoir L to the tops of the furnaces above, and across which they respectively extend. S represents branch pipes connected with the main conducting-pipes R R', which branch pipes are provided with stop-cocks, and look down, respectively, into holes about two inches square, which open directly through the arches of the said furnaces, for the purpose of allowing the oil-jets escaping from *s* to fall unobstructed directly onto the glowing coals, and be ignited into flames. These openings are shown by the letter U. The stop-cocks in these branches are represented by T. The openings U are placed about eighteen inches from the inside of the furnace-doors, for the purpose of allowing the oil-jets to fall onto the glowing coals sufficiently far inside the furnaces to insure instantaneous combustion. No smoke or gas will rise through these openings, because the blast pipes force the products of combustion into the kiln, make a partial vacuum in the ends of the furnaces next to the doors, and draw in air through the grate-bars, and consequently through the several openings U. These openings are placed a little one side of the blast-nozzles, and not on a line with them, so that the blast-jets may not strike the falling oil-jets and blow them away before they are thoroughly ignited, mixed with air, and saturated with oxygen. To effect their perfect combustion, I prefer to allow these oil-jets to fall directly onto the red-hot coals, and to burst into flames to be mingled with air and swept by the blast-jets into the kiln. When the fires are kindled on the grate-bars, and the coal-dust or fine coal is spread over the bars to a depth of about eight inches, more or less, the several cocks T are slightly opened, and the liquid fuel flows under pressure from the reservoir L from the ends of the branch pipes S in a very fine stream through the openings U into the respective furnaces, as aforesaid.

Nothing can exceed, it is believed, the economy, intensity, purity, and abundance of incandescent gases secured by this combination of elements. Hard coal-dust may be had from all the coal-yards for the expense of carting it away. Coal-gas tar may be had from all the gas-works at a trifling cost.

The combustion of the gas-tar in the manner shown enables the red hot coal-dust to make immensely more flame at much less cost than the best bituminous or cannel coal or the best wood. This great abundance of cheap flame mingled with superheated steam, and driven into the kiln by the forcible blast-jets, and retained in it in a measure under pressure by means of the covering platting-courses C C' of hard-burned bricks, laid close together and breaking joints, fills the whole honey-comb of the kiln with an equal heat, pushes out to the side walls and up to the top, where it escapes through the crevices of the cover.

Many advantages result from this method of burning bricks, and the other articles aforesaid. The furnaces being short, the labor of throwing the coal into them is much less than into the long arches of the old kilns. The heat is better regulated and may be increased or diminished at pleasure by opening or closing to any extent the stop-cocks T and the blast-cocks Q.

It will be seen also that the continuous oil-jets falling into the furnaces and the continuous blast-jets, produces a continuous and uniform heat, which is of the utmost importance to the proper burning of all molded forms of clay or other substances requiring a high and continuous heat.

Fig. 3 shows a plan view on the line $a\ b$ of Fig. 1, showing the method of setting the first few courses of raw bricks directly on the floor of the kiln with a view to form flues for conducting the heat from the several furnaces under the whole bottom of the kiln.

W represents these flues. X represents the raw-brick walls between them. Y shows the flues next to the inclosing kiln-walls. It will be seen that these flues taper from the fireplaces down to almost nothing at the center of the kiln. The object of this is to choke off the inflowing gases, and to cause them to rise up more abundantly next to the inclosing-walls of the kiln.

It will be observed also that each furnace feeds two flues, except the four end furnaces. These all force the heat into one tapering flue in direct contact with the inclosing-walls of the kiln. This is a novelty which the old kilns do not possess. After these several flues are built up about one foot high the bricks are then set solid, three on three, in the ordinary way, up to the top of the kiln.

Having thus fully described my invention and explained its nature and operation, what I claim, and desire to secure by Letters Patent, is as follows:

1. A reservoir, L, with conducting-pipes R R' leading therefrom, and having pipes S communicating with them, with valves T, in combination with the openings U into the furnaces E, substantially in the manner and for the purposes hereinbefore shown and described.

2. The arrangement of furnaces, in combination with the devices shown, for discharging into the same gas-tar, dead-oil, or other liquid fuel, substantially in the manner and for the purposes hereinbefore shown and described.

3. The arrangement of furnaces with devices for discharging into them jets of steam or air, in combination with devices for discharging into the same furnaces jets of gas-tar, dead-oil, or any hydrocarbon or liquid fuel, substantially in the manner and for the purposes set forth.

4. The openings U into the furnaces E, in combination with the said devices for supplying them with gas-tar, dead-oil, petroleum, and other liquid fuel, for combustion in the said furnaces, substantially in the manner and for the purposes shown and described.

5. The furnaces E, in combination with the tapering flues W and Y and partition-walls X, substantially in the manner and for the purposes hereinbefore set forth.

HENRY W. ADAMS, JR.

Witnesses:
ISAAC R. OAKFORD,
ALEXANDER H. MORGAN.